United States Patent [19]

Salsman

[11] Patent Number: 4,977,191

[45] Date of Patent: Dec. 11, 1990

[54] WATER-SOLUBLE OR WATER-DISPERSIBLE POLYESTER SIZING COMPOSITIONS

[75] Inventor: Robert K. Salsman, Conyers, Ga.

[73] Assignee: The Seydel Companies, Inc., Atlanta, Ga.

[21] Appl. No.: 372,015

[22] Filed: Jun. 27, 1989

[51] Int. Cl.$^5$ .............................................. C08J 11/04
[52] U.S. Cl. .................................... 521/48; 521/48.5; 528/272; 528/296; 528/300; 528/302; 528/308; 528/308.1; 525/444; 525/448; 524/601; 524/605
[58] Field of Search ................ 521/48, 48.5; 528/272, 528/296, 300, 302, 308, 308.1; 525/444, 448; 524/601, 605

[56] References Cited

U.S. PATENT DOCUMENTS

| | | | |
|---|---|---|---|
| 3,814,627 | 6/1974 | Marshall et al. | 428/395 |
| 3,959,230 | 5/1976 | Hays | 528/297 |
| 3,962,152 | 8/1976 | Nicol et al. | 252/551 |
| 4,027,346 | 7/1977 | Wada et al. | 8/115.6 |
| 4,048,104 | 9/1977 | Svoboda et al. | 521/159 |
| 4,104,222 | 8/1978 | Date et al. | 524/247 |
| 4,125,370 | 11/1978 | Nicol | 8/137.5 |
| 4,370,143 | 1/1983 | Bauer | 8/493 |
| 4,485,196 | 11/1984 | Sperenza et al. | 521/172 |
| 4,539,341 | 9/1985 | Hallmark et al. | 521/172 |
| 4,604,410 | 6/1986 | Altenberg | 521/172 |
| 4,701,477 | 10/1987 | Altenberg et al. | 521/167 |

Primary Examiner—John Kight, III
Assistant Examiner—Sam Acquah
Attorney, Agent, or Firm—Cort Flint

[57] ABSTRACT

A water-soluble or water-dispersible polyester resin composition, suitable for textile sizing applications, comprises a reaction product of 20–50% by weight of waste terephthalate polymer, 10–40% by weight of at least one glycol and 5–25% by weight of at least one oxyalkylated polyol. Preferred compositions also comprise 20–50% by weight of isophthalic acid. A further water-soluble or water-dispersible resin comprises a reaction product of 20–50% by weight of waste terephthalate polymer, 10–50% by weight of at least one glycol and 20–50% by weight of isophthalic acid.

35 Claims, No Drawings

WATER-SOLUBLE OR WATER-DISPERSIBLE POLYESTER SIZING COMPOSITIONS

DESCRIPTION

TECHNICAL FIELD

This invention relates to water-soluble or water-dispersible textile sizing compositions, made from waste terephthalate plastic articles. This invention permits utilization of waste plastic materials, which would otherwise be discarded in landfills or other solid waste disposal facilities.

BACKGROUND ART

Date et al., in U.S. Pat. No. 4,104,222, have proposed making a dispersion of linear polyester resin by mixing linear polyester resin with a higher alcohol/ethylene oxide addition-type surface-active agent, melting the mixture and dispersing the resulting melt in an aqueous alkali solution. The products are used as coating and impregnating agents.

Altenberg, in U.S. Pat. No. 4,604,410, has proposed making etherified modified aromatic polyols by digesting scrap polyalkylene terephthalate with a low molecular weight polyhydroxy compound, containing 3–8 hydroxyl groups. A resulting intermediate is alkoxylated with 1–4 moles of ethylene oxide and/or propylene oxide. The final product is useful in making polyurethane and polyisocyanurate foams.

Sperenza et al. (U.S. Pat. No. 4,485,196) have recited reacting recycled polyethylene terephthalate scrap with an alkylene glycol to produce an intermediate, which is reacted with an alkylene oxide, such as propylene oxide. The product can be used in making rigid foams.

Other methods of reacting scrap polyalkylene terephthalate with glycols or polyols are proposed by Svoboda et al. (U.S. Pat. No. 4,048,104) and Altenberg et al. (U.S. Pat. No. 4,701,477).

References proposing the use of copolymers containing terephthalic units and and units derived from alkylene and polyoxyalkylene glycols for fiber or fabric treatment include Hayes (U.S. Pat. No. 3,959,230), Nicol et al. (U.S. Pat. No. 3,962,152), Wada et al. (U.S. Pat. No. 4,027,346), Nicol (U.S. Pat. No. 4,125,370) and Bauer (U.S. Pat. No. 4,370,143).

Marshall et al., in U.S. Pat. No. 3,814,627, have proposed applying an ester, based on polyethylene glycol, to polyester yarn.

DISCLOSURE OF INVENTION

In one aspect, this invention relates to a water-soluble or water-dispersible polyester resin, comprising a reaction product of 20–50% by weight of waste terephthalate polymer, 10–40% by weight of at least one glycol and 5–25% by weight of at least one oxyalkylated polyol. Preferred resins also comprise 20–50% by weight of isophthalic acid.

In another aspect, this invention relates to a water-soluble or water-dispersible polyester resin, comprising a reaction product of 20–50% by weight of waste terephthalate polymer, 10–50% by weight of at least one glycol and 20–50% by weight of isophthalic acid.

This invention further relates to water-soluble or water-dispersible resins, as above, dissolved or dispersed in water with an alkali metal or ammonium hydroxide or carbonate.

In another aspect, this invention relates to fiber, paper or fabric, coated with the foregoing water-soluble or water-dispersible resins.

DETAILED DESCRIPTION

The water-soluble or water-dispersible resins are made from waste terephthalate polymers, including bottles, sheet material, textile wastes and the like. The waste terephthalate plastics may be bought from recyclers and include, but are not limited to, material identified as "PET rock." The waste terephthalate can be characterized by the unit formula

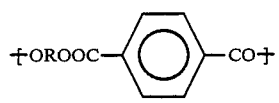

wherein R is the residue of an aliphatic or cycloaliphatic glycol of 2–10 carbons or of an oxygenated glycol of the formula

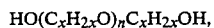

wherein x is an integer from 2–4 and n is 1–10.

Preferably the waste terephthalate polymer is polyethylene terephthalate, polybutylene terephthalate, poly(cyclohexanedimethanol terephthalate) or a mixture thereof.

It will be understood that, for reasons of economy, the use of waste terephthalates is preferred. However, the use of virgin terephthalate resins is to be included within the scope of the disclosure and appended claims.

The glycol with which the waste terephthalate polymer is reacted can be selected from among a variety of known dihydric alcohols. Preferred glycols include, but are not limited to, ethylene glycol, diethylene glycol, triethylene glycol, cyclohexanedimethanol, propylene glycol, butylene glycol, neopentyl glycol, 1,5-pentanediol, 1,6-hexanediol or mixtures thereof. Most preferably, the glycol is a mixture of diethylene glycol and neopentyl glycol.

The oxyalkylated polyol is derived from any polyol, having three or more alcohol functions. Polyols include glycerol, trimethylolpropane, trimethylolethane, pentaerythritol, erythritol, sorbitol, mannitol, other sugar alcohols or monosaccharides. The polyols are oxyalkylated with an alkylene oxide, including, but not limited, to ethylene oxide, propylene oxide, butylene oxide, amylene oxide, etc.

Preferably, the oxyalkylated polyol is glycerol, trimethylolpropane, trimethylolethane, pentaerythritol, erythritol or a monosaccharide, oxyalkylated with 5–30 moles of ethylene oxide, propylene oxide or a mixture thereof, per hydroxyl of the polyol.

The water-soluble or water-dispersible polyester resins can further include 3–15% by weight of trimellitic acid or anhydride as well as 1–10% by weight of polyol. Polyols are chosen as above.

The polyester resins can be made by heating waste terephthalate polymer, glycol, oxyalkylated polyol and, optionally, isophthalic acid together in any order until breakdown and reconstruction of a mixed terephthalate-isophthalate ester has occurred. This process normally requires, for acceptable reaction times, temperatures above about 150° C. to the decomposition point of the ester product.

In making the water-soluble or water-dispersible polyesters, it is preferred to heat the waste terephthalate polymer, glycol and oxyalkylated polyol above about 150° C. to partially breakdown the terephthalate and then to heat the thus-produced intermediate with isophthalic acid under similar temperature conditions.

A most preferred product is that obtained by heating waste terephthalate polymer, glycol and oxyalkylated polyol above about 150° C. to produce an intermediate product, characterized by a 15-minute clear peel, and heating the thus-obtained intermediate product with isophthalic acid at a temperature of at least 150° C.

Polyester resins, containing trimellitic acid or trimellitic anhydride, are preferably made by heating an isophthalic acid-containing intermediate with trimellitic acid or trimellitic anhydride. It is preferred to obtain an intermediate, having a 15-minute clear peel, before reaction with isophthalic acid and then with trimellitic acid or anhydride.

Resins made from waste terephthalate polymer, glycol and isophthalic acid are preferably made by heating waste terephthalate polymer with at least one glycol above about 150° C. to produce an intermediate product, characterized by a 15-minute clear peel, and heating the thus-obtained intermediate product with isophthalic acid at a temperature of at least 150° C. Subsequent reaction with trimellitic acid or trimellitic anhydride is preferred.

Preferred terephthalate feeds are as above. Most preferred feeds are polyethylene terephthalate or poly(cyclohexanedimethanol terephthalate).

Glycols are as recited above. Particularly preferred is a mixture of diethylene glycol and cyclohexanedimethanol.

A preferred product is that comprising a reaction product of 20-50% by weight of polyethylene terephthalate, 10-30% by weight of diethylene glycol, 20-50% by weight of isophthalic acid and 3-15% by weight of trimetllitic acid or trimellitic anhydride.

A highly-preferred water-soluble or water-dispersible polyester resin comprises a reaction product of 20-50% by weight of polyethylene terephthalate, 10-30% by weight of diethylene glycol, 1-10% by weight of pentaerythritol, 5-25% by weight of oxyalkylated glycerol of 5-30 oxyalkyl units per hydroxyl, 20-50% by weight of isophthalic acid and 3-15% by weight of trimellitic acid or trimellitic anhydride.

The polyester resins are usually and preferably made using an ester-interchange catalyst. These catalysts are well known organometallic compounds, particularly compounds of tin or titanium. Preferred catalysts include tetraalkyl titanates, in which the alkyl is of up to 8 carbon atoms, as well as alkyl stannoic acids or dialkyl tin oxides, such as monobutyl stannoic acid or dioctyl tin oxide. Preferred catalysts include monobutyl stannoic acid and tetrapropyl or tetrabutyl titanate, or a mixture thereof.

The resinous products obtained are generally taken up in relatively concentrated aqueous solutions of alkali metal or ammonium hydroxides or carbonates. The concentration employed can be determined by routine experimentation. However, if shipping of the concentrated aqueous solutions to a point of use is contemplated, it is preferred to produce highly concentrated solutions. It is within the scope of this invention to produce initial solutions or dispersions, containing 20-30% or more of resin solids.

The compositions of this invention are used as sizing materials for fibers, fabrics or paper. In the textile industry, yarns are often sized before incorporation into woven or nonwoven fabrics. Sizing consists of depositing a desired amount of sizing material onto the yarn. Sizing increases the tensile strength of yarns and, in some cases, reduces yarn-to-metal coefficient of friction. Strengthening yarn is desirable in order to minimize breakage in subsequent operations, such as weaving. A low yarn-to-metal coefficient of friction decreases yarn and machine wear.

Sizing materials can also be applied to fabrics. These fabrics are known as loom finished goods. The treated fabrics, after removal from the loom, before any further washing steps, have a hand which is influenced by the characteristics of the fiber, of the fabric and by the type and amount of sizing on the fabric. The products of this invention are useable when a water-soluble sizing is acceptable.

Sizing compositions are normally applied to paper in a size press. The paper sheet is semi-dried and is run through the dam of a sizing solution at high speed. The paper is then run through press rolls under a high nip pressure and the treated sheet is dried under a dryer. Surface sizing is often considered superior to internal sizing because most of the sizing solution is retained on the paper.

In any of the foregoing applications for the products of this invention, the resins are either taken up in a solution of an alkali metal or ammonium carbonate or hydroxide to the desired concentration or a relatively concentrated solution or dispersion in aqueous alkali metal or ammonium hydroxide or carbonate is diluted with water to the desired concentration. The concentration of material to be applied to fiber, fabric or paper can readily be determined by routine experimentation. However, preferably, the solution or dispersion of water-soluble or water-dispersible resin being applied contains 0.5-5% of resin solids.

BEST MODE FOR CARRYING OUT THE INVENTION

A most preferred water-soluble or water-dispersible polyester resin comprises a reaction product of 25-40% by weight of polyethylene terephthalate, 20-30% by weight of diethylene glycol, 1-10% by weight of pentaerythritol, 5-15% by weight of oxyethylated glycerine having 5-30 oxyethylene units per hydroxyl, 20-30% by weight of isophthalic acid and 5-10% by weight of trimellitic acid or trimellitic anhydride.

A similarly preferred polyester resin comprises a reaction product of 20-50% by weight of poly(cyclohexanedimethanol terephthalate), 10-30% by weight of diethylene glycol, 20-50% by weight of isophthalic acid and 3-15% by weight of trimellitic acid or trimellitic anhydride.

Without further elaboration it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the following examples, the temperatures are set forth uncorrected in degrees Celsius. Unless otherwise indicated, all parts and percentages are by weight.

EXAMPLE 1

Preparation of Water-soluble Resin from Scrap Polyethylene Terephthalate

The following ingredients are used:

| parts by weight | |
|---|---|
| 19.05 | diethylene glycol |
| 5.04 | neopentyl glycol |
| 2.18 | pentaerythritol |
| 11.01 | ethoxylated glycerine (17–19 moles of ethylene oxide, molecular weight 850, Witco Chemical Co., Witconol 4073) |
| 0.08 | monobutyl stannoic acid |
| 30.47 | scrap polyethylene terephthalate |
| 25.87 | isophthalic acid |
| 6.2 | trimellitic anhydride |
| 0.1 | tetrapropyl titanate |

The alcohols are charged to a reaction vessel and heated to 200° C. to remove water. Titanate catalyst is charged to the hot alcohol mixture, after which PET is added in three batches. The initial third of the PET is added to the alcohols at 200° C., whereupon the temperature in the reactor is increased to 240° C. and maintained at 240° C. for 15 min. Half of the remaining PET is added and the temperature is kept at 240° C. for 15 min more, after which the remaining third of the PET is added. The temperature in the reactor is kept at 240° C. until a 15-minute clear peel is obtained.

Clear peel time is determined by placing a drop of the reaction mixture on a Petri dish and starting a timer. The time at which the drop becomes opaque is the limit of the clear peel.

When the 15-minute clear peel is obtained, the temperature in the reactor is reduced to 185° C. and monobutyl stannoic acid and then isophthalic acid are charged to the reactor. The resulting mixture is heated until an acid value of 15–20 is obtained. The resulting mixture is cooled to 180° C. and the trimellitic anhydride is charged to the reactor. At the end of 30 minutes, all of the trimellitic anhydride has reacted. The resulting resinous mixture is dissolved to a level of 25% solids in aqueous ammonia solution.

EXAMPLE 2

Preparation of Water-soluble Resin from Scrap Polybutylene Terephthalate

The following materials are used:

| parts by weight | |
|---|---|
| 20.0 | triethylene glycol |
| 5.0 | neopentyl glycol |
| 2.5 | trimethylolpropane |
| 11.5 | ethoxylated trimethylolpropane (10 moles of ethylene oxide) |
| 0.1 | monohexyl stannoic acid |
| 29.5 | scrap polybutylene terephthalate |
| 30.0 | isophthalic acid |
| 1.0 | tetra(isopropyl) titanate |

The PBT is broken down as in Example 1 to produce a resinuous material, which is taken up in dilute sodium hydroxide solution to produce a stable dispersion.

EXAMPLE 3

Preparation of Water-soluble Resin from Scrap Poly(cyclohexanedimethanol Terephthalate)

The following ingredients are used:

| parts by weight | |
|---|---|
| 25.0 | ethylene glycol |
| 20.0 | ethoxylated pentaerythritol (15 moles of ethylene oxide) |
| 30.0 | scrap poly (cyclohexanedimethanol terephthalate) |
| 24.8 | isophthalic acid |
| 0.2 | tetrabutyl titanate |

The procedure of Example 1 is followed. The resinous product obtained is dissolved in aqueous KOH solution, to a solids content of 20%.

EXAMPLE 4

Preparation and Use of Sizing Dispersions

The products of Examples 1–3 are diluted with water to solids contents of 1–3% by weight. The diluted dispersions are used to size cellulosic, polyester, polyamide and acrylic fibers and fabrics. The compositions adhere to the treated fibers or fabrics. Smoothness and elongation are improved.

The diluted materials are also used for sizing paper products.

EXAMPLE 5

Preparation of Water-soluble Resin from Scrap Polyethylene Terephthalate

The following ingredients are used:

| parts by weight | |
|---|---|
| 11.0 | diethylene glycol |
| 21.55 | cyclohexanedimethanol |
| 30.0 | scrap polyethylene terephthalate |
| 0.08 | monobutyl stannoic acid |
| 3.91 | polyethylene glycol (Pluracol PEG 4000) |
| 0.1 | tetrapropyl titanate |
| 23.36 | isophthalic acid |
| 10.0 | trimellitic anhydride |

The glycols are charged to a reactor and heated to 200° C. to remove water. Titanate catalyst is charged to the reactor, after which one third of the PET is added and the temperature in the reactor is raised to 240° C. After 15 minutes' heating at this temperature, half of the remaining PET is charged to the reactor. After 15 minutes more, the rest of the PET is added. The temperature in the reactor is kept at 240° C. until a 15-minute clear peel is obtained.

The temperature in the reactor is dropped to 185° C. Monobutyl stannoic acid is charged to the reactor, followed by the isophthalic acid. The mixture in the reactor is cooked until an acid value of 15–20 is obtained. The temperature may be raised to 220° C. during this step. The resulting product is cooled to 180° C. and the trimellitic anhydride is added. After 1 hr at this temperature, all of the trimellitic anhydride has reacted. The resulting resin is ground into a coarse powder, which is blended with sodium carbonate.

EXAMPLE 6

Preparation of Water-soluble Resin from Scrap Poly(Cyclohexanedimethanol Terephthalate)

The following ingredients are used:

| parts by weight | |
| --- | --- |
| 20.0 | tetraethylene glycol |
| 0.1 | monobutyl stannoic acid |
| 0.1 | tetrabutyl titanate |
| 40.0 | scrap poly (cyclohexanedimethanol terephthalate) |
| 35.0 | isophthalic acid |
| 3.0 | trimellitic anhydride |

A resin is prepared as in Example 5. The hot resin is taken up in ammonium hydroxide solution to a solids content of 27%.

EXAMPLE 7

Preparation of Water-soluble Resin from Scrap Polybutylene Terephthalate

The following materials are used:

| parts by weight | |
| --- | --- |
| 15.0 | ethylene glycol |
| 12.0 | neopentyl glycol |
| 40.0 | scrap PBT |
| 32.0 | isophthalic acid |
| 0.1 | monobutyl stannoic acid |
| 0.1 | tetrapropyl titanate |

The resinous product, obtained as in Example 5, is chopped up into a coarse powder and blended with potassium carbonate.

EXAMPLE 8

Preparation of Sizing from Water-soluble Resins

The products of Examples 5-7 are taken up in water to product solutions/dispersions, containing 1-3% by weight of resin solids. The resulting solutions/dispersions are used as sizing materials for fibers, fabrics or paper. Results are similar to those of Example 4.

EXAMPLE 9

Preparation of Water-soluble Resin from Scrap Polyethylene Terephthalate

The following materials are used:

| parts by weight | |
| --- | --- |
| 30 | diethylene glycol |
| 10 | pentaerythritol |
| 20 | ethoxylated glycerol (7-9 EO units) |
| 40 | scrap PET |
| 0.08 | monobutyl stannoic acid |
| 0.1 | tetrabutyl titanate |

The alcohols are charged to a reaction vessel and heated to 200° C. to remove water. Titanate catalyst is charged to the hot alcohol mixture, after which PET is added in three batches. The initial third of the PET is added to the alcohols at 200° C., whereupon the temperature in the reactor is increased to 240° C. and kept at 240° C. for 15 min. Half of the remaining PET is added and the temperature is kept at 240° C. for 15 min more, after which the rest of the PET is added. Heating at 240° C. is continued for about 15 min more.

The resulting resin is dissolved in aqueous sodium hydroxide solution to a solids content of 30%. Material diluted with water to a solids content of 1-3% by weight is used as in Examples 4 and 8. Similar results are obtained.

The preceding examples can be repeated with similar success by substituting the generically or specifically described reactants and/or operating conditions of this invention for those used in the preceeding examples.

From the foregoing description, one skilled in the art can easily ascertain the essential characteristics of this invention and, without departing from the spirit and scope thereof, can make various changes and modifications of the invention to adapt it to various usages and conditions.

I claim:

1. A water-soluble or water-dispersible polyester resin, comprising a reaction product of 20-50% by weight of waste terephthalate polymer, 10-40% by weight of at least one glycol and 5-25% by weight of at least one oxyalkylated polyol.

2. The resin of claim 1, comprising a reaction product also containing 20-50% by weight of isophthalic acid.

3. The water-soluble or water-dispersible polyester resin of claim 2, comprising a product of heating waste terephthalate polymer, glycol and oxyalkylated polyol above about 150° C. to produce an intermediate product, characterized by a 15-minute clear peel, and heating the thus-obtained intermediate product with isophthalic acid at a temperature of at least 150° C.

4. The water-soluble or water-dispersible resin of claim 1, comprising a product of further reaction with 3-15% by weight of trimellitic acid or trimellitic anhydride.

5. The water-soluble or water-dispersible polyester resin of claim 1, comprising the reaction product of waste terephthalate of the unit formula

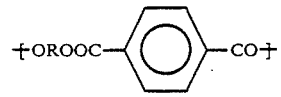

wherein R is the residue of an aliphatic or cycloaliphatic glycol of 2-10 carbons or of an oxygenated glycol of the formula

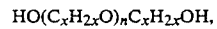

wherein x is an integer from 2-4 and n is 1-10.

6. The water-soluble or water-dispersible polyester resin of claim 1, wherein the waste terephthalate polymer is polyethylene terephthalate, polybutylene terephthalate, poly(cyclohexanedimethanol terephthalate) or a mixture thereof.

7. The water-soluble of water-dispersible polyester resin of claim 1, wherein the glycol is ethylene glycol, diethylene glycol, triethylene glycol, cyclohexanedimethanol, propylene glycol, butylene glycol, neopentyl glycol, 1,5-pentanediol, 1,6-hexanediol or a mixture thereof.

8. The water-soluble or water-dispersible polyester resin of claim 1, wherein the glycol is a mixture of diethylene glycol and neopentyl glycol.

9. The water-soluble or water-dispersible polyester resin of claim 1, wherein the oxyalkylated polyol is glycerol, trimethylolpropane, trimethylolethane, pentaerythritol, erythritol or a monosaccharide, oxyalkylated with 5-30 moles of ethylene oxide, propylene oxide or a mixture thereof, per hydroxyl of the polyol.

10. The water-soluble or water-dispersible polyester resin of claim 1, further comprising 1-10% by weight of a polyol.

11. The water-soluble or water-dispersible polyester resin of claim 2, comprising a reaction product of 20-50% by weight of polyethylene terephthalate, 10-30% by weight of diethylene glycol, 1-10% by weight of pentaerythritol, 5-25% by weight of oxyalkylated glycerol of 5-30 oxyalkyl units per hydroxyl, 20-50% by weight of isophthalic acid and 3-15% by weight of trimellitic acid or trimellitic anhydride.

12. The water-soluble or water-dispersible polyester resin of claim 1, comprising a reaction product prepared in the presence of monobutyl stannoic acid or a tetraalkyl titanate, or a mixture thereof.

13. The water-soluble or water-dispersible polyester resin of claim 2, comprising a reaction product of 25-40% by weight of polyethylene terephthalate, 20-30% by weight of diethylene glycol, 1-10% by weight of pentaerythritol, 5-15% by weight of oxyethylated glycerine having 5-30 oxyethylene units per hydroxyl, 20-30% by weight of isophthalic acid and 5-10% by weight of trimellitic acid or trimellitic anhydride.

14. The water-soluble or water-dispersible polyester resin of claim 1, dissolved or dispersed in water with an alkali metal or ammonium hydroxide or carbonate.

15. The water-soluble or water-dispersible polyester resin of claim 2, dissolved or dispersed in water with an alkali metal or ammonium hydroxide or carbonate.

16. The water-soluble or water-dispersible resin of claim 14, diluted with water to a resin solids content of 0.5-5%.

17. The water-soluble or water-dispersible resin of claim 15, diluted with water to a resin solids content of 0.5-5%.

18. Fiber, fabric or paper coated with the water-soluble or water-dispersible resin of claim 16.

19. Fiber, fabric or paper coated with the water-soluble or water-dispersible resin of claim 17.

20. A water-soluble or water-dispersible polyester resin, comprising a reaction product of 20-50% by weight of waste terephthalate polymer, 10-50% by weight of at least one glycol and 20-50% by weight of isophthalic acid.

21. The water-soluble or water-dispersible polyester resin of claim 20, comprising a product of heating waste terephthalate polymer with at least one glycol above about 150° C. to produce an intermediate product, characterized by a 15-minute clear peel, and heating the thus-obtained intermediate product with isophthalic acid at a temperature of at least 150° C.

22. The water-soluble or water-dispersible polyester of claim 20, comprising a product of further reaction with 3-15% by weight of trimellitic acid or trimellitic anhydride.

23. The water-soluble or water-dispersible resin of claim 20, comprising a reaction product of a waste terephthalate of the unit formula

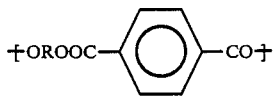

wherein R is the residue of an aliphatic or cycloaliphatic glycol of 2-10 carbon atoms or of an oxygenated glycol of the formula $$HO(C_xH_{2x}O)_nC_xH_{2x}OH$$

wherein x is an integer from 2-4 and n is 1-10.

24. The water-soluble or water-dispersible polyester resin of claim 20, wherein the waste terephthalate is polyethylene terephthalate.

25. The water-soluble or water-dispersible polyester resin of claim 20, wherein the waste polyester is poly(cyclohexanedimethanol terephthalate).

26. The water-soluble or water-dispersible polyester resin of claim 20, wherein the glycol is ethylene glycol, diethylene glycol, triethylene glycol, cyclohexanedimethanol, propylene glycol, butylene glycol, neopentyl glycol, 1,5-pentanediol, 1,6-hexanediol or a mixture thereof.

27. The water-soluble or water-dispersible polyester resin of claim 20, wherein the glycol is a mixture of diethylene glycol and cyclohexanedimethanol.

28. The water-soluble or water-dispersible polyester resin of claim 20, comprising a reaction product of 20-50% by weight of polyethylene terephthalate, 10-30% by weight of diethylene glycol, 20-50% by weight of isophthalic acid and 3-15% by weight of trimellitic acid or trimellitic anhydride.

29. The water-soluble or water-dispersible polyester resin of claim 20, comprising a reaction product of 20-50% by weight of poly(cyclohexanedimethanol terephthalate), 10-30% by weight of diethylene glycol, 20-50% by weight of isophthalic acid and 3-15% by weight of trimellitic acid or trimellitic anhydride.

30. The water-soluble or water-dispersible polyester resin of claim 20, comprising a reaction product prepared in the presence of monobutyl stannoic acid or a tetraalkyl titanate, or a mixture thereof.

31. The water-soluble or water-dispersible polyester resin of claim 20, dissolved or dispersed in water with an alkali metal or ammonium hydroxide or carbonate.

32. The water-soluble or water-dispersible polyester resin of claim 20, comprising a reaction product of 20-40% by weight of polyethylene terephthalate, 15-25% by weight of diethylene glycol, 20-30% by weight of isophthalic acid and 3-15% by weight of trimellitic acid or trimellitic anhydride.

33. The water-soluble or water-dispersible polyester resin of claim 16, comprising a reaction product of 20-40% by weight of poly(cyclohexanedimethanol terephthalate), 15-20% by weight of ethylene glycol, 20-30% by weight of isophthalic acid and 3-15% by weight of trimellitic acid or trimellitic anhydride.

34. The water-soluble or water-dispersible resin of claim 31, diluted with water to a resin solids content of 0.5-5%.

35. Fiber, fabric or paper coated with the water-soluble or water-dispersible resin of claim 34.

* * * * *